United States Patent

Perry

[15] 3,691,829
[45] Sept. 19, 1972

[54] WEATHER VANE ANOMOMETER

[72] Inventor: Frederic F. Perry, 105 B Pleasant, Melrose, Mass. 02176

[22] Filed: June 12, 1970

[21] Appl. No.: 45,666

[52] U.S. Cl. ................................. 73/189, 35/40
[51] Int. Cl. ............................................ G01w 1/04
[58] Field of Search..... 73/188, 189; 33/204 R; 35/40

[56] References Cited

UNITED STATES PATENTS

| | | | |
|---|---|---|---|
| 3,420,101 | 1/1969 | Adams | 73/189 |
| 3,406,570 | 10/1968 | White | 73/189 |
| 2,836,064 | 5/1958 | York | 73/188 |
| 2,375,227 | 5/1945 | Hillman | 73/189 |
| 2,923,861 | 2/1960 | Colt | 73/189 X |
| 2,611,051 | 9/1952 | Kolff | 73/188 |
| 1,475,075 | 11/1923 | Macy | 73/189 |

*Primary Examiner*—Richard C. Queisser
*Assistant Examiner*—Marvin Smollar
*Attorney*—Pennie, Edmonds, Morton, Taylor & Adams

[57] ABSTRACT

There is disclosed a weather vane anomometer having a self-contained source of electrical power and means associated therewith for indicating on a map wind and storm direction.

4 Claims, 5 Drawing Figures

PATENTED SEP 19 1972						3,691,829

INVENTOR.
FREDERIC F. PERRY
BY Pennie Edmonds
Morton, Taylor and Adams
ATTORNEYS

INVENTOR.
FREDERIC F. PERRY

ATTORNEYS

WEATHER VANE ANOMOMETER

BACKGROUND OF THE INVENTION

Weather vanes are known which operate electrically to provide meter indications of wind velocity. Such vanes generally require a source of electrical power independent of the vane and display sensed wind information in an unclear manner particularly for those who lack technical or meteorological training.

It is the purpose of the present invention to provide a weather vane which obviates such difficulties and which will indicate at a glance both wind and storm direction with respect to a local geographical area.

SUMMARY OF THE INVENTION

According to the invention, a weather vane includes an anomometer which drives one or more electrical generators. The position of the weather vane is related through an electrical contact system to the points of the compass such that rotation of the vane will provide a precise indication of wind direction. Wind direction is transmitted through the aforesaid contact system to a display panel which contains a chart of the local geographical area. Additionally, wind direction is transposed through the contact system to indicate storm direction upon the display panel. Wind velocity is indicated by a meter provided in the panel.

These and other aspects of the invention will be understood by examining the following detailed specification and the accompanying drawing.

DESCRIPTION OF THE PREFERRED EMBODIMENT

Figure 1:
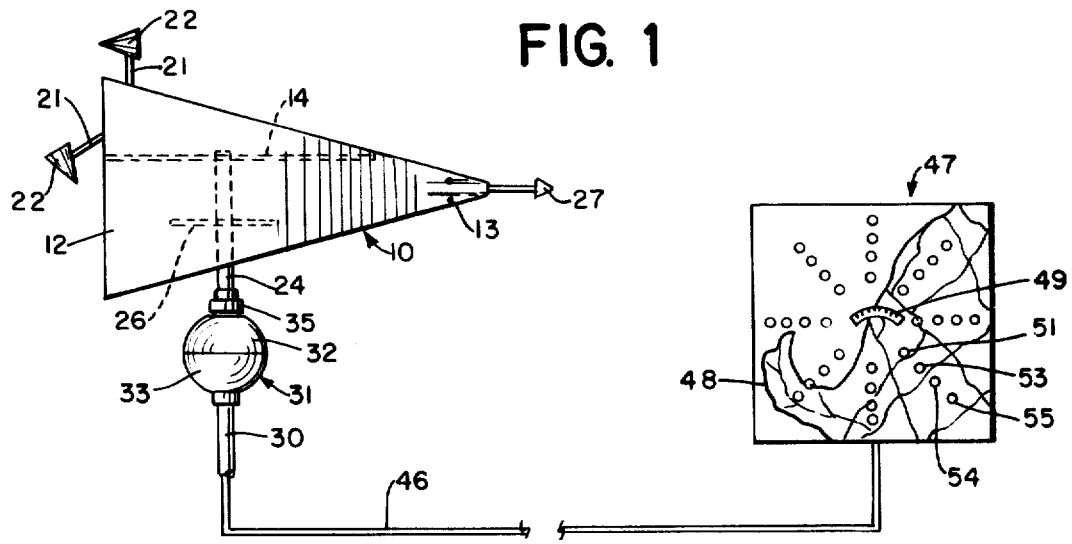
FIG. 1 is an over all symmetrical drawing illustrating the components making up the invention.
Figure 2:
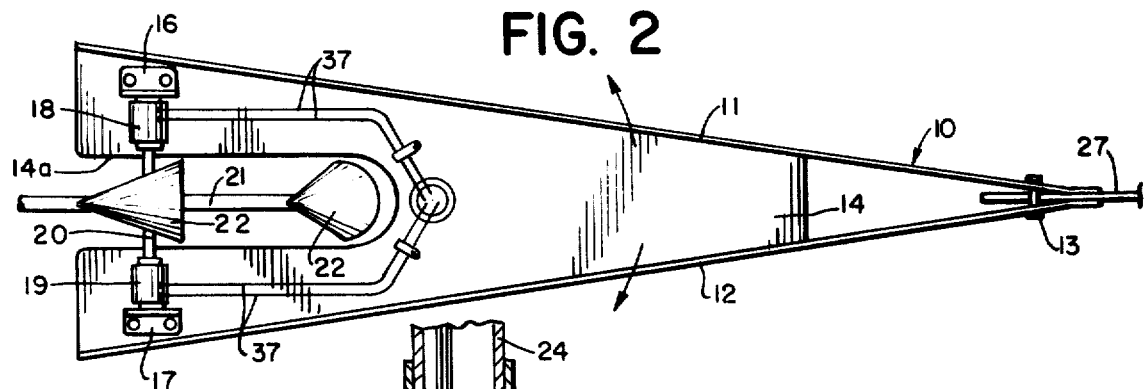
FIG. 2 is a plan view of the weather vane illustrated in FIG. 1.
Figure 3:
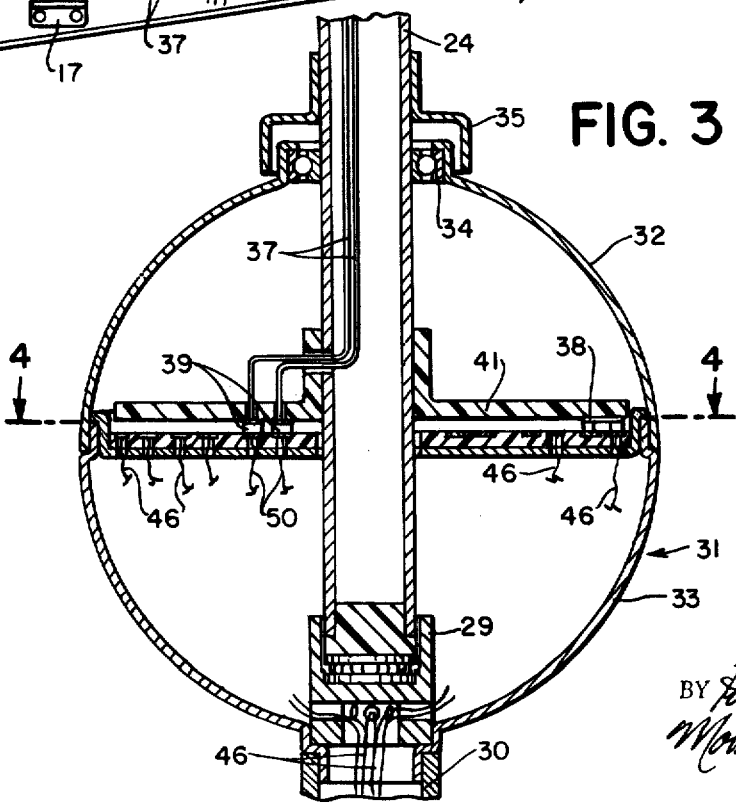
FIG. 3 is a vertical cross-sectional view of portions of the weather vane, and associated contact system.
Figure 4:
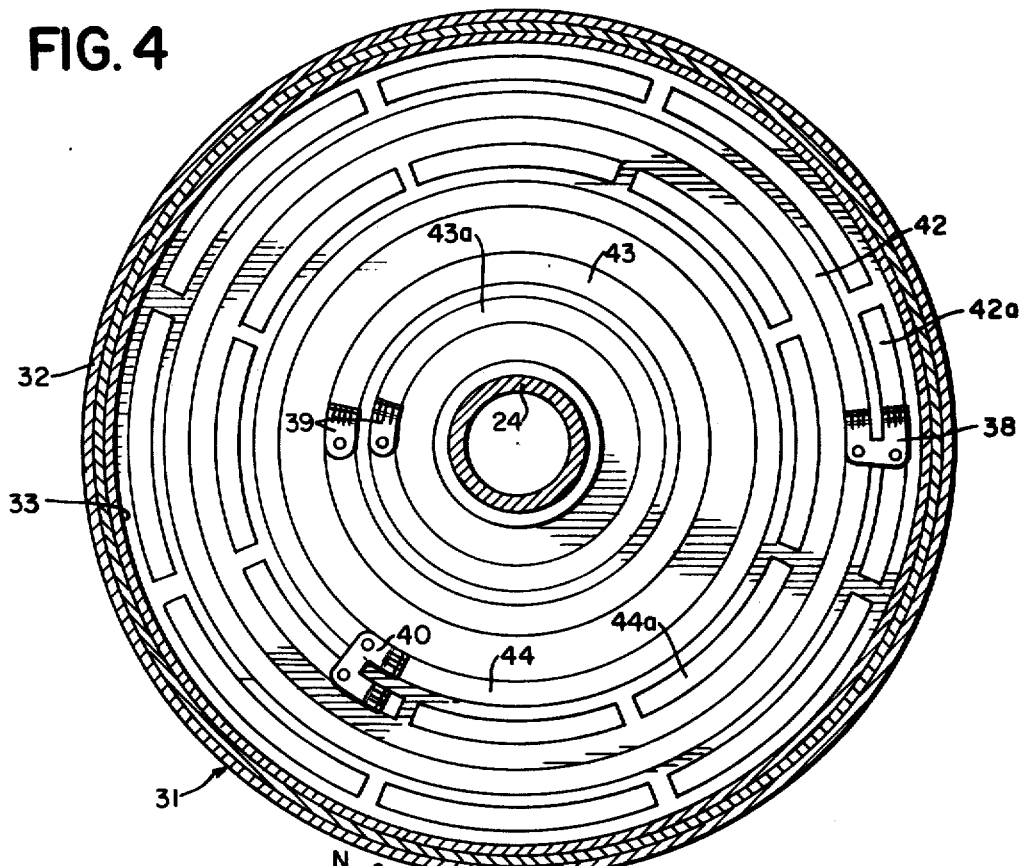
FIG. 4 is a view taken in the direction of arrows 4—4 of FIG. 3.

Referring to the drawing, a weather vane 10 is constructed having two triangular sides 11 and 12 bolted at 13 to form a leading edge. The sides 11 and 12 are further secured divergently by a plate 14 having a cutout 14a at the rear thereof. Attached to the plate 14 by means of brackets 16 and 17 are generators 18 and 19 having a common drive shaft 20. The shaft 20 mounts three spokes 21 to which are attached at the outer ends anomometer cups 22. The plate 17 is further pivotally attached to the upper end of a shaft 24. A second plate 26 is connected to the shaft 24 and to the sides 11 and 12. Secured at the front end of the vane 10 is a pointer 27 which counterbalances the vane.

Shaft 24 extends downwardly into a cup bearing 29 which is at the upper end of a stanchion 30 secured to a suitable structure. The stanchion 30 further is rigidly attached to a spherical housing 31 having upper and lower hemispheres 32, 33. The upper hemisphere 32 holds bearing 34 which journals the shaft 24. Cap 35 attached to the shaft 24 is provided for weather protection. Electrical leads, such as for example leads 37 extend from the generators 18 and 19 through the shaft 24 and respectively to a series of shaft-mounted movable contacts 38, 39 and 40. These are carried by a nonconductive contact plate 41, contacts 38, 39 and 40 make contact with stator contact sections 42, 42a, 43, 43a and 44, 44a. Stator sections 42a and 43a are broken to cause a discontinuous circuit whereas stator sections 44, 44a are continuous. Each of the stator sections just mentioned are connected by appropriate wiring 46 which extends through the stanchion 30 and into the interior of a building or structure. Contact 40 and stator sections 43, 43a have been included for illustrative purposes. As will be shown, contact 38 and stator sections 42, 42a together with contact 39 and stator sections 44, 44a are only needed to carry out the invention.

Figure 5:
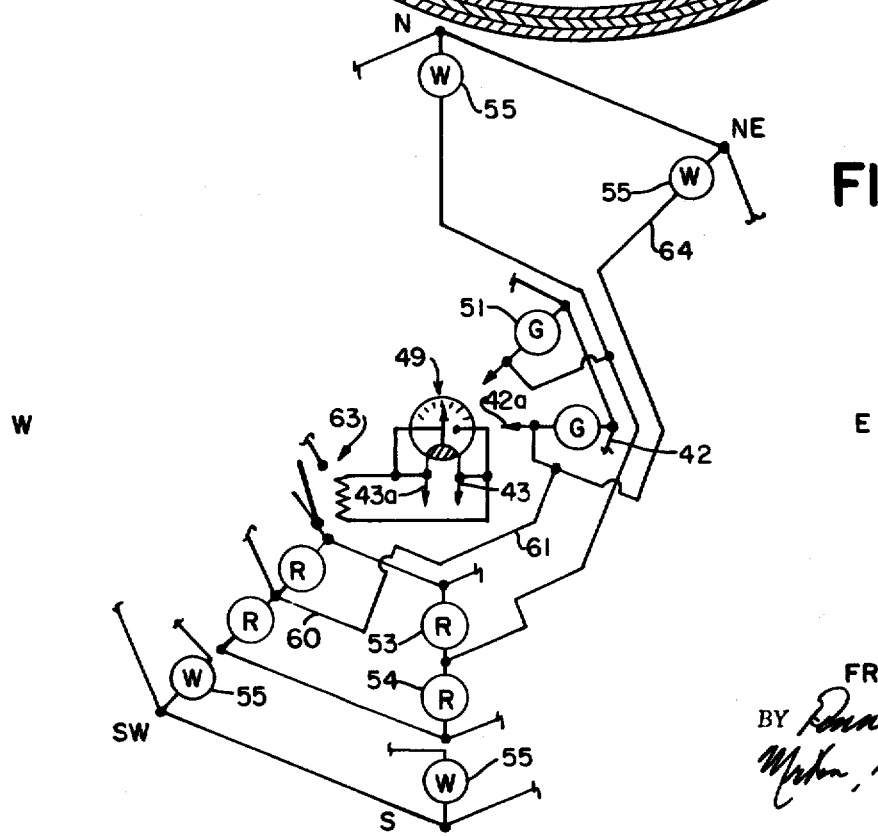

Within a building or structure may be located a display panel 47 upon which is superimposed a map 48 of the local geographical area. At the center of the display panel is a gauge 49 indicating wind velocity to which is connected leads 50 which make contact with the innermost contacts 39. Thus, wind velocity can be directly and continuously read at the center of display panel 47. Immediately away from the center of the display panel are a series of lights 51, colored green for example which are on radii indicating different compass directions. Proceeding outwardly on the same radii are two sets of red colored lights 53, 54 which will indicate storm direction. Finally, an outer circle of white lights 55 will indicate fair weather direction. The wiring of the respective lights on the display panel is shown in FIG. 5 and will now be explained.

Each of the green lights 51 are connected to a stator section 42–42a and thus a light 51 will be illuminated whenever contact 38 makes electrical contact with a section 42a connected to one of the lights 51. The wiring of individual lights 51 on the display panel 47 will be in relation to the compass direction of the weather vane 10 so as to show wind direction by lighting an appropriate green light 51 on the display panel.

Connected in series with each light 51 by means of wire connections 60, 61 is one of the outer circle of red lights 54. In each case the relationship between a wind direction light 51 and a red light 54 connected electrically thereto is an angular distance counter clockwise of 135°. Each red light 54 will therefore indicate the direction from which a storm is approaching in relation to true wind direction. It will be seen that the next set of lights 53 are each individually connected to wire connection 61 but will be connected to common only through the relay operated switch 63. The switch 63 will be operated by means of switch contacts in the velocity gauge 49 when the velocity of the wind reaches, for example 65 m.p.h. This will be adjustable. Gauge 49 operates directly from stator sections 44, 44a which continuously deliver a voltage proportional to the output of generators 18 and 19.

The outermost circle of lights 55 indicate fair weather or high pressure direction and are diametrically opposite to storm direction indicator lights 54, 53. Lights 55 are connected in series by means of wire connections 60, 64 to the true wind direction indicator circuit controlling individual lights 51.

The operation of the weather vane anomometer according to the present invention is as follows:

The vane 10 will be mounted by means of stanchion 30 to any suitable structure, building, house etc. in the usual manner. Rotation of the vane 10 will cause relative rotation between the contact 38-40 and stator contacts sections 42-44. Current is supplied for electrical purposes by means of generators 18, 19 which are driven by anomometer cups 22. It will be noted that the position of the anomometer cups is such that only one cup at a time is exposed and that each cup when reversing its direction due to rotation is shielded within the body of vane 10. Leads 37 from generators 18, 19 supply current to movable contact sections 39 and continuously complete a circuit through continuous stator contacts 44, 44a. Current therefore will be continuously supplied whenever the anomometer rotates to velocity gauge 49 in proportion to the speed of rotation of the anomometer.

Movable contact sections 38 are oriented precisely with respect to the direction of the wind and therefore stator sections 42a will each light a respective inner indicator light 51 to indicate wind direction. Outer red lights 54 are transposed 135° in a clockwise direction with respect to the direction of the wind, and will each light together with one of the wind direction lights 51. In accordance with a well-known meteorological principle such an indication as reflected in lights 54 will provide storm direction in the northern hemisphere. When wind velocity reaches say 65 m.p.h. on velocity gauge 49, relay 63 will close and the next inner red storm light 53 will be illuminated to provide an indication of increasing storm intensity and nearness. Finally, white indicator lights 55 (fair weather direction) will be illuminated separately in conjunction with wind and storm direction lights 51, 54.

Thus it will be seen that the weather vane anomometer of the present invention quickly provides the layman an indication of wind velocity, wind direction and storm direction superimposed upon a chart of the local area. Additionally, the unit is self-powered. The anomometer cups are able to register wind velocity very accurately by being positioned to rotate in a vertical plane with only the cup facing the wind being exposed.

It will be understood that the above description relates to a particular embodiment and is there merely representative. In order to appreciate fully the scope of the invention reference should be made to the appended claims.

I claim:

1. An electrically powered wind and storm direction indicator comprising a first compass oriented circular series of wind indicating direction lights and a second compass oriented circular series of storm indicating lights, a weather vane rotatable 360° about a vertical axis, a switching circuit for selectively and sequentially energizing those wind direction and storm direction indicator lights which are angularly displaced 135° from one another, said switching circuit including a stationary compass oriented commutator segment means for each of the wind and storm direction lights, a movable switch contact rotatable with a vane for making concurrent contact with said commutator segment means representing wind and storm direction, an anomometer driven electrical generator carried by said vane, means electrically connecting said generator to said movable contact, and means electrically connecting the commutator segment means with each of the related compass lights, whereby rotation of said vane will cause the sequential energization of ones of said wind and storm direction lights which are related in compass direction to the direction of said vane.

2. An indicator according to claim 1 wherein a display panel remotely positioned from said vane mounts at least two concentric circles of indicator lights comprising said first and second series, said panel including a chart of the local geographic area, the position of said vane being indicated upon said chart as the center of said concentric circles of indicator lights.

3. The indicator according to claim 2 wherein a third concentric series of compass oriented indicator lights are mounted on said panel, each of said third series of lights being located along a radius with respect to each of said second series of lights toward the center of said concentric series, said panel contains a wind speed meter connected to said generator, and means associated with said meter for switching respective ones of said third series of indicator lights into operation upon an increase of wind speed above a predetermined value.

4. A weather vane for providing remote indications of wind (velocity) speed and direction comprising a vane, shaft means rotatable with said vane for mounting said vane to a structure in an exposed position, an anomometer attached to said vane for rotation relative thereto, said anomometer including a plurality of cups disposed for rotation in a vertical plane, said vane being constructed to shield at all times all cups except one, electrical generating means connected to said anomometer, first electrical contact means fixed relative to said structure, second electrical contact means rotatable with said shaft and connected to said electric generator source, a remote display panel, light indicator means on said display panel connected to said first electrical contact means, the arrangement of said respective contact means providing a changing indication on said display panel of rotation of said vane due to changing wind direction and means responsive to increasing and decreasing output of said electrical generating means to indicate wind speed.

* * * * *

PO-1050
(5/69)

UNITED STATES PATENT OFFICE
CERTIFICATE OF CORRECTION

Patent No. 3,691,829          Dated September 19, 1972

Inventor(s)      Frederic F. Perry

It is certified that error appears in the above-identified patent and that said Letters Patent are hereby corrected as shown below:

Column 4, line 6 "rotatable with a vane" should read --rotatable with said vane--.

Signed and sealed this 26th day of June 1973.

(SEAL)
Attest:

EDWARD M. FLETCHER, JR.
Attesting Officer

ROBERT GOTTSCHALK
Commissioner of Patents